United States Patent Office 3,279,893
Patented Oct. 18, 1966

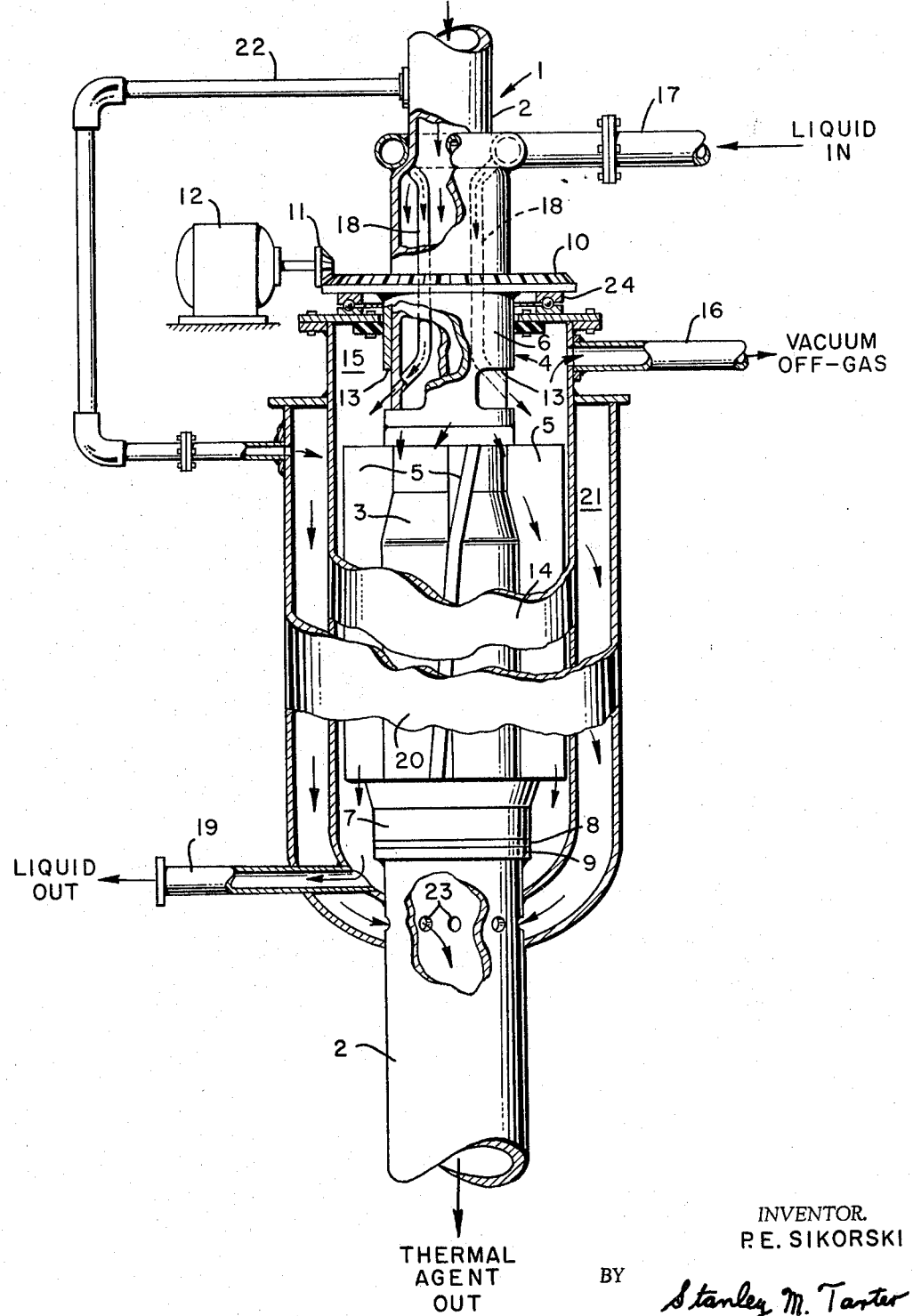

3,279,893
APPARATUS FOR PROCESSING LIQUIDS
Paul E. Sikorski, Pensacola, Fla., assignor to Monsanto Company, a corporation of Delaware
Filed July 5, 1963, Ser. No. 292,903
9 Claims. (Cl. 23—285)

This invention relates to apparatus for processing liquids, solutions and concentrates, and more particularly, relates to apparatus for polymerizing reacting materials and producing products having high molecular densities and high relative viscosities.

The apparatus comprising the invention is herein referred to as a "finisher" device and is applied to the polycondensation of such as nylon for purposes of illustration, however, it will be understood that the apparatus is not limited thereto since other applications are contemplated.

Polycarbonamides such as the nylons and the like, according to one procedure, are formed by subjecting an aqueous solution of a polycarbonamide-forming composition to evaporating conditions and then to superatmospheric pressures and polyamide-forming temperatures to carry out the polycondensation or polyamide-forming reaction. As the polycondensation of such polyamide-forming compositions progresses, the viscosity of the polyamide reaction mass increases; and, it has been found that with the use of heretofore known apparatus portions of this viscous reaction mass tend to remain in a relatively stagnant or physically inert condition particularly in the latter stages of the polycondensation process wherein the mass is ordinarily subjected to an enervating climate. This polycondensation climate together with the increasing viscosity of the mass tends to inhibit the efficient performance of the polycondensation process in that the poly-joining of the amine ends with the carboxyl ends is greatly impeded and in that considerable difficulty is experienced in removing the water of reaction from the reaction mass. As a result of the inclination of the water of reaction to remain engaged in the mass, there is a tendency of the polycondensation process to reverse or not to proceed to its normal completion, thereby producing a polyamide product of inferior quality.

Further difficulties have been encountered in the use of present day polycondensation apparatus not only as a result of the enervating climate inherently induced by the use of the known apparatus and to which the reaction mass is subjected but, also as a result of inferior heat transfer conditions common to such apparatus both during evaporation and polycondensation. Because of these drawbacks, it has been found that the reaction mass must be maintained at a high temperature for undesirably long periods of time in order to insure evaporation of volatile products and a favorable completion of the polycondensation reaction. As is well known, maintaining polymer-forming compositions such as those described above at a high temperature for a relatively long period produces thermal degradation or degeneration of the resultant polymer. In addition, as the polymerization process nears completion and the viscosity of the reaction mass approaches its desired optimum value, the heat applied to the mass creates an excess of polymerization in in portions and/or undesirable side reactions with the result that clusters of obnoxious materials commonly referred to as "gels" are formed. Although the chemical composition of these gels is not precisely understood, it is known that these gels are objectionable and cause substantial reduction of the quality of the polymeric end product. Various structures have been proposed to maintain the reaction mass in a turbulent state and promote heat transfer conditions during the last stage of polymerization, all of which have failed to overcome this gelation problem. Furthermore, thermal degradation of the polymer is still encountered.

A low surface-to-volume ratio between the materials undergoing polycondensation and the ambient gas tends to limit the elimination of water or the like product of reaction from the liquid phase to the gas phase. As indicated above the disengagement of water from the reaction mass is of critical importance in the successful carrying out of certain polycondensation processes. It is, therefore, highly desirable that a high surface-to-volume ratio be obtained in order to promote the elimination of water or like material resulting from the union of the molecule undergoing polycondensation and to increase the efficiency of carrying out of the polycondensation process. Furthermore, a low surface-to-volume ratio reduces the rate at which the water of solution in the mass is evaporated, adding a further limitation to the effective carrying out of a solution-type polycondensation process.

It is a primary object of this invention to provide apparatus adapted for processing liquid and fluid materials.

Another object is to provide apparatus designed to effect thermal, vaporization and polymerization of materials moving in the form of a thin film.

Another object is to provide apparatus arranged to effect a high rate of heat transfer within a short operating time, a large surface exposure, and a high rate of vapor removal uniformly while processing polymer compounds.

Another object is to provide a finisher device for use in the polycondensation of polycarbonamides such as nylon.

The apparatus for processing liquids embodying the invention comprises a vessel having a central tube normally charged with a heating medium or fluid that flows unrestrictedly therethrough. A blade carrier means is rotatably journaled about the central tube and is driven by suitable gear and motor means operatively connected thereto. The blades of the carrier means are spaced a predetermined distance away from the central tube and extend radially outwardly therefrom and linearly along the length thereof. An annular reaction chamber defined in the vessel sealingly surrounds the blades of the carrier means and an annular thermal chamber defined in the vessel sealingly surrounds the reaction chamber. A liquid such as a polymerizable material to be reacted is fed to the reaction chamber through conduit and slot means provided in the tube and carrier means, respectively, and flows by gravity into the path of the rotating blades and forms an annular stream around the central tube. The polymer is wiped by the edges of the rotating blades against the surface of the central tube forming a thin film therearound and imparts a spiraling movement to the polymer stream in its downward passage through the reaction chamber.

The annular polymer stream flowing through the reaction chamber is heated at the inner surface thereof by heating medium charged through the central tube and concurrently at the outer surface thereof by heating medium supplied to the thermal chamber surrounding the reaction chamber providing a high penetration and uniform transfer of heat to the polymer. Volatiles removed from the liquid are carried away from the reaction chamber through a vacuum discharge outlet opening. The outlet opening is connected to conventional vacuum producing equipment.

Another alternative means of removing moisture is by sparging inert gas such as nitrogen through the reaction chamber in which case the vessel would be adapted with an inlet means for introducing the inert gas.

The polymer flows out of the reaction chamber through a suitable polymer discharge line and the heating medium is also discharged from the thermal chamber by suitably provided outlet means.

A better understanding of the apparatus will be derived by reference to the following more detailed description and to the drawing showing a single elevational view of the apparatus of the invention partially in section and with vessel portions broken away.

The preferred embodiment of the process apparatus embodying the invention is described herein for purposes of illustration as a "finisher" device 1 employed in the polycondensation method of processing such as nylon 66. Nylon 66 according to a continuous polymerization method is produced by passing a reacting salt solution such as hexamethylenediamine and adipic acid through four stages of controlled processing: evaporation, reaction, flashing and finishing. In the evaporation stage water is removed from the salt solution by an evaporation unit; in the reaction stage the salt solution having moisture removed is reacted to form a polymer of low molecular weight; in the flashing stage the low molecular weight material is heated and subjected to reduced pressure; and in the finishing stage the material is further polymerized by a finisher unit. These stages are continuous and with slight modification the evaporator, reactor and finisher units may be of the same construction.

Finisher device 1 comprises an elongated central tube 2 having a frustro-conical portion 3 connecting small and larger diameter sections of the tube intermediate its ends thereof. Tube 2 is normally charged with a heating medium which may be "Dowtherm" vapors, steam or the like that passes through the tube from upper to lower end thereof as viewed in the drawing in an unrestricted flow for transmitting heat to wall of tube. Preferably, tube 2 is operative in an upright position as shown in the drawing.

A blade carrier member 4 is journaled rotatably about tube 2. Carrier member 4 has a plurality of spaced blades 5 symmetrically arranged about tube 2 and connected at their ends by an upper sleeve 6 and a lower sleeve 7. Blades 5 are arranged to extend radially outwardly from the axis of tube 2 and for a linear distance past each side of the frustro-conical portion 3 thereof. Lower sleeve 7 rests on a thrust bearing 8 mounted between sleeve 7 and a collar 9 formed on tube 2. The upper sleeve 6 has a large annular axially arranged bevel ring gear 10 secured thereto which engages with a bevel gear 11 driven by a motor 12. The upper sleeve 6 has a plurality of slots 13 extending through the wall thereof and arranged circumferentially about sleeve 6.

A first shell 14 sealingly surrounds carrier member 4 in spaced relation from a point below the ring gear 10 to a point below the lower sleeve 7. Shell 14 defines a reaction chamber 15 between shell 14 and tube 2 to which a polymerizable material is normally delivered. Blades 5 of carrier member 4 are designed to rotate within chamber 15 with a slight clearance between the inner edge of the blades and the wall of the tube and are helically curved in relation to the axis of tube 2 to spirally transport the polymerizable material through chamber 15. By varying the helix angle of the blades 5 the sojourn time of the polymer can be controlled such as to shorten or hasten the rate of flow of the polymer through chamber 15. A vacuum outlet pipe 16 connected to a vacuum means (not shown) to produce sub-atmospheric pressure in pipe 16 opens into chamber 15 and permits discharge of vapor gases therefrom.

A manifold 17 normally carrying a low molecular weight polymer delivered from a flasher device, as previously described, surrounds tube 2 at the upper end thereof as shown in the drawing and a plurality of branch pipes 18 extend from manifold 17 inwardly through the wall of tube 2 through suitable ports provided therein. Branch pipes 18 extend from the manifold through the interior of tube 2 to a point adjacent slots 13 in the upper sleeve 6 of carrier 4 where the pipes project through the wall of tube 2 via suitably provided openings therein so as to be open to slots 13. The polymer from manifold 17 flows into the reaction chamber 15 through branch pipes 18 and slots 13 of carrier member 4.

Secured to the lower end of shell 14 is a discharge outlet 19 that serves to permit the finished higher molecular weight polymer to be discharged from chamber 15.

A second shell 20 surrounds shell 14 in sealing and spaced relation therefrom providing a thermal chamber 21 between the shells. Dowtherm or like heating fluid from the upper end of tube 2 is fed through a circulating pipe 22 to thermal chamber 21 thus maintaining a heating jacket about chamber 15. The Dowtherm discharges from chamber 21 to the interior of tube 2 through a plurality of perforations 23 formed in the latter tube. A bearing 24 is interposed between gear 10 and the top of shell 14 for rotatably mounting the upper end of carrier member 4.

If desired, the outer edges of blades 5 can be constructed to extend to within a close distance of the wall of shell 20 so as to wipe the polymer against the shell wall and to form another thin film of polymer in addition to the one formed on tube 2.

In operation, carrier member 4 is driven rotatably about tube 2 by means of motor 12 and gears 10 and 11. A polymerizable material having been processed through an evaporator, reactor and flasher is delivered for further polymerization to finisher 1 through manifold 17 and flows by gravity to chamber 15 through branch pipes 18 and rotating slots 13 that open intermittently to the pipes 18. The material entering chamber 15 from slots 13 cascades over the frustro-conical portion 3 of tube 2 and forms an annular stream about tube 2. The polymer flows into contact with blades 5 and is wiped against the surface of tube 2 as it passes through chamber 15. The polymer solution is spirally rotated by the helical blades as it passes through chamber 15 and is subjected to heat from tube 2 and also from the wall of shell 14 effecting a high transfer of heat to a large surface area of the polymer thereby effecting a high vaporization of volatiles from the polymer which is removed through vacuum discharge pipe 16. Polymerization is effected uniformly throughout the mass of the polymer for a short period of time and the polymer is discharged from chamber 15 through pipe 19.

The finisher apparatus embodying the invention is simple in structure and provides many advantages over conventional polymerization units. The application of heat from both the inside and outside of an annular polymer stream assures a uniform penetration as well as a high rate of heat transfer to the stream and reduces process time. The shorter processing time further minimizes the likelihood of gel formation and permits operation of the blade carrier member at slower speeds. By forming a thin film of the polymer around a heated surface of tube 2, a high rate of evaporation of volatiles from the polymer is attained and the vapor is removed with a minimum entraining of the vapor into the polymer stream. The circulation of Dowtherm through the finisher apparatus is unrestricted so that a new supply is furnished constantly to provide proper heat transfer. Polymer flow is unrestricted in a substantially straight line path through the finisher apparatus.

It will be understood that variations and modifications of the novel apparatus as described and illustrated in the drawing may be made within the spirit of the invention and the scope of the following claims.

I claim:

1. Liquid processing apparatus comprising:
   (a) a tube normally having a thermal agent flowing therethrough,
   (b) a carrier member including a perforated portion and a plurality of spaced blades mounted to rotate in closely spaced relation about said tube,
   (c) drive means connected to said carrier member,
   (d) power means operatively connected to said drive means for rotating said blades of said carrier member about said tube, (e) a jacket surrounding said carrier member in spaced relation forming a sealed liquid chamber therebetween, (f) manifold means, extending through a portion of the interior of said tube and opening into said sealed liquid chamber through the wall of said tube and said perforated portion of said carrier member, for delivering a liquid to said sealed liquid chamber, and (g) discharge means for discharging said liquid from said liquid chamber.

2. Liquid processing apparatus comprising:
(a) a central tube normally having a thermal agent flowing unrestrictedly therethrough,
(b) a carrier member supported on and mounted coaxially and rotatably about said central tube,
(c) said carrier member including a blade portion, a perforated portion and a drive portion,
(d) power means operatively connected to said drive portion of said carrier member for rotating the latter about said central tube,
(e) a first jacket sealingly and spacingly surrounding the blade and perforated portions of said carrier member and providing a liquid chamber between said central tube and said jacket,
(f) manifold means normally carrying a liquid and including a plurality of branch conduits extending through the wall of said central tube at one point therein and through the wall thereof at another point adjacent said perforated portion of said carrier member to communicate with said liquid chamber via perforations in said perforated portion for delivering liquid thereto,
(g) discharge means open to said liquid chamber for discharging liquid therefrom,
(h) a pipe open to said liquid chamber and connected to vacuum source for discharging vapor therefrom,
(i) a second jacket sealingly and spacingly surrounding said first jacket and providing a thermal chamber therebetween,
(j) inlet means to said thermal chamber for delivering a thermal agent thereto, and
(k) a plurality of perforations in said central tube communicating with said thermal chamber for discharging said thermal agent therefrom.

3. Liquid processing apparatus as claimed in claim 2, wherein said drive means comprises a plurality of engaging gears.

4. Liquid processing apparatus as claimed in claim 2, wherein said blade portion of said carrier member comprises a plurality of spaced blades extending substantially radially outwardly in relation to the axis of said central tube and along the linear length thereof with the edges of the blades in closely spaced relation from the surface thereof.

5. Liquid processing apparatus as claimed in claim 4, wherein said blades helically curve about said central tube.

6. Liquid processing apparatus according to claim 2, wherein said central tube is elongated and wherein said perforated portions of said carrier member is located above said blade portion thereof.

7. Liquid processing apparatus as claimed in claim 6, wherein said central tube has a frustro-conical section below said perforated portion of said carrier member and adjacent said blade portion thereof.

8. Liquid processing apparatus as claimed in claim 2, wherein the inner edges of said blades are in closely spaced relation to the surface of said central tube and the outer edges thereof are in closely spaced relation to the wall of said one jacket.

9. Liquid processing apparatus comprising:
(a) an elongated uprightly positioned tube normally having a thermal agent flowing unrestrictedly therethrough including a collar and a frustro-conical portion,
(b) a manifold having branch lines extending inwardly through the wall of said tube and for a distance through said tube and then outwardly through the wall of said tube above said frustro-conical portion thereof,
(c) a carrier member mounted coaxially about said tube and supported thereon by said collar thereof,
(d) annular bearing means interposed between said collar of said tube and said carrier member,
(e) said carrier member including a blade section having a plurality of spaced blades surrounding the frustro-conical portion of said tube and extending radially outwardly from the axis thereof with the inner edges of said blades spaced away from the surface of said tube, a perforated section above said blade section with the perforations thereof being open to said branch lines of said manifold, and a gear drive section above said perforated section,
(f) a first spaced jacket sealingly connected to said carrier member below said gear drive portion thereof and to said tube below said collar thereof for defining a liquid chamber between said tube and said jacket for introducing liquid thereto from said branch lines of said manifold via said perforations in said perforated section of said carrier member,
(g) a second spaced jacket surrounding said first spaced jacket and sealingly connected thereto and to said tube for defining a thermal chamber between said first and second jackets,
(h) a conduit open at one end to said tube and at the opposite end to said thermal chamber for circulating the thermal agent from said tube to said thermal chamber,
(i) bearing means interposed between said gear drive section of said carrier member and said first spaced jacket,
(j) a discharge line leading from said liquid chamber for discharging liquid therefrom,
(k) a plurality of openings in said tube opening to said thermal chamber for permitting the thermal agent in said thermal chamber to discharge into said tube, and
(l) a pipe open to said liquid chamber and connected to a vacuum source for evacuating vapors therefrom.

References Cited by the Examiner

UNITED STATES PATENTS 1,039,779 10/1912 Miles _____ 165—92
2,394,291 2/1946 Calcott et al. _____ 23—285 X MORRIS O. WOLK, *Primary Examiner.*

JAMES H. TAYMAN, Jr., *Assistant Examiner.*